United States Patent [19]
Marino et al.

[11] Patent Number: 4,472,779
[45] Date of Patent: Sep. 18, 1984

[54] ENGINE TIMING APPARATUS FOR USE IN TESTING

[75] Inventors: Joseph A. Marino, Waukesha; Michael J. Kling, Mequon, both of Wis.; Sydney J. Roth, Largo, Fla.

[73] Assignee: Bear Automotive Service Equipment Company, Milwaukee, Wis.

[21] Appl. No.: 327,497

[22] Filed: Dec. 4, 1981

[51] Int. Cl.[3] .................... G01M 15/00; F02P 17/00; G06F 15/20

[52] U.S. Cl. .............................. 364/431.01; 73/117.3; 324/391

[58] Field of Search ........................... 364/551, 431.01; 73/116, 117.3; 324/391, 392

[56] References Cited

U.S. PATENT DOCUMENTS

| | | | |
|---|---|---|---|
| 3,597,677 | 8/1971 | MacCrea | 324/391 |
| 3,768,004 | 10/1973 | Abnett et al. | 324/392 |
| 3,955,135 | 5/1976 | Fastaia | 324/392 X |
| 4,006,403 | 2/1977 | Olsen et al. | 73/116 |
| 4,063,152 | 12/1977 | Reeves | 324/392 |
| 4,128,005 | 12/1978 | Arnston et al. | 73/117.3 |
| 4,145,746 | 3/1979 | Trussell et al. | 364/551 |
| 4,170,131 | 10/1979 | Gniewek et al. | 73/116 |
| 4,291,383 | 9/1981 | Tedeschi et al. | 364/551 |
| 4,331,029 | 5/1982 | Wilson | 324/391 X |
| 4,375,672 | 3/1983 | Kato et al. | 364/551 |

*Primary Examiner*—Felix D. Gruber
*Attorney, Agent, or Firm*—Kinney & Lange

[57] ABSTRACT

Engine timing apparatus includes a timing light, cylinder clock signal circuitry, a cylinder counter, a cylinder comparator, first, second and third timers, a trigger pulse generator, operator control buttons, and a computer. The first timer measures a first time period between firing of the No. 1 cylinder, and the second timer measures a second time period between firing of the cylinder preceding No. 1 and the firing of the No. 1 cylinder. The computer derives from the first and second time periods a first digital value which represents the angular degrees from firing of the cylinder preceding No. 1 to firing of the No. 1 cylinder. Each time the comparator output signal is produced, the third timer initiates an adjustable time period, and the trigger pulse generator triggers the timing light at the end of the adjustable time period. The operator control buttons include buttons which cause a second digital value to be increased or decreased. The computer uses the first and second digital values and the measured first time period to control the adjustable time period of the third timer. When the operator has varied the second digital value so that the flashing of the timing light corresponds to top dead center of the No. 1 cylinder, the computer causes an angular value to be displayed which represents the angular relationship between firing of the igniter and top dead center of the No. 1 cylinder.

11 Claims, 9 Drawing Figures

ENGINE TIMING APPARATUS FOR USE IN TESTING

BACKGROUND OF THE INVENTION

1. Field of the Invention

The present invention relates to engine timing apparatus for measuring the timing advance/retard angle of a multi-cylinder internal combustion engine.

2. Description of the Prior Art

For many years, it has been conventional practice in providing for the measurement and adjustment of the ignition advance angle of an internal combustion engine to provide a visible timing mark on the pulley of the engine. A stroboscopic lamp or "timing light" is directed on the pulley to illuminate the timing mark. The timing light is energized under the control of ignition pulses from the ignition system, so that the timing mark appears to be stationary when illuminated by the timing light. By adjusting the delay interposed between an ignition pulse from the ignition system and the subsequent firing of the timing light so that the timing mark appears to be at a top dead center position, it is possible to determine the amount of ignition timing advance with respect to top dead center.

In prior art engine timing apparatus, the time delay between firing of the cylinder (typically the No. 1 cylinder) and the flashing of the timing light typically has been adjusted by means of a potentiometer which has a calibrated knob or dial. When the proper setting of the potentiometer has been attained, the dial on the potentiometer is read by the operator. This gives an indication of the degrees of advance of the No. 1 ignition pulse with respect to top dead center. An example of this type of prior art engine timing apparatus is shown in U.S. Pat. No. 3,597,677 by R. S. MaC Crea and Joseph C. Marino.

U.S. Pat. No. 3,955,135 by Fastaia shows another engine timing apparatus in which a delay potentiometer is adjusted by the operator. Timing is measured by enabling a digital counter to measure the time between the firings of the No. 1 cylinder (as measured by a No. 1 cylinder probe) and a delayed output signal from the timing light. The timing advance angle is computed based upon the count representing the time delay, the number of cylinders of the engine, and the contents of a counter used to compute rpm of the engine. The computed timing advance is displayed on an output display unit.

The prior art engine timing apparatus has typically required not only the timing light, but also a No. 1 probe for sensing when the No. 1 ignition pulse is produced and a probe or connector to produce a signal indicating firing of each of the cylinders of the engine. Often the service technician is merely interested in a quick check of timing, and the connecting of several connectors or probes is an inconvenience to the technician. There is a continuing need for improved engine timing apparatus using a timing light which is easier for the technician to use, and which requires a minimum number of probes or connectors in order to perform the timing function.

With the advent of low cost electronic devices, and in particular microprocessors, digital electronic systems have found increasing use in a wide variety of applications. Digital electronic systems have many significant advantages over analog systems, including increased ability to analyze and store data, higher accuracy, greater flexibility in design and application, and the ability to interface with computers having larger and more sophisticated data processing and storage capabilities. There is also a continuing need in engine analyzer systems for an engine timing apparatus which is consistent with and takes full advantage of the capabilities of microprocessors and digital circuitry to control the timing light and the engine timing function.

SUMMARY OF THE INVENTION

The present invention is an engine timing apparatus for testing a multi-cylinder internal combustion engine with the use of a timing light. In the apparatus of the present invention, a first time period between firing of a selected cylinder is measured. A second time period between firing of the cylinder preceding the selected cylinder and the selected cylinder is also measured. Based upon the measured first and second time periods, a first digital value representative of the angular degrees from firing of the cylinder preceding the selected cylinder to firing of the selected cylinder is derived.

Each time the cylinder preceding the selected cylinder is fired, an adjustable time period is initiated. At the end of the adjustable time period, the timing light is triggered to produce a light pulse. The adjustable time period is controlled as a function of the first digital value, a second operator-controlled digital value, and the measured first time period. When the second digital value is adjusted to a point where the desired synchronization of the timing light with the timing mark on the engine is achieved, an angular value representative of the angular relationship between firing of the selected cylinder and top dead center of the selected cylinder is displayed. This angular value is based upon the second digital value.

In a preferred embodiment, the second digital value is adjusted by means of an operator-actuated ADVANCE button or switch which causes the second digital value to be sequentially decreased and an operator-actuated RETARD button or switch which causes the second digital value to be sequentially increased. When the desired timing angle has been attained, as indicated by proper synchronization of the light pulse of the timing light with top dead center of the selected cylinder, an operator-actuated STORE button or switch is actuated, which causes the angular value to be computed and displayed based upon the second digital value.

The present invention also preferably includes an operator-actuated BUMP switch which permits the operator to change the selected cylinder. As a result, a "No. 1 probe" as required in the prior art is not needed. Instead, the operator (e.g. a service technician) merely operates the timing light and changes the selected cylinder until the timing mark appears when the timing light is flashed. This procedure can be performed quickly, and avoids requiring additional connections to the engine, such as connection of the No. 1 probe.

DETAILED DESCRIPTION OF THE PREFERRED EMBODIMENTS

Figure 1:
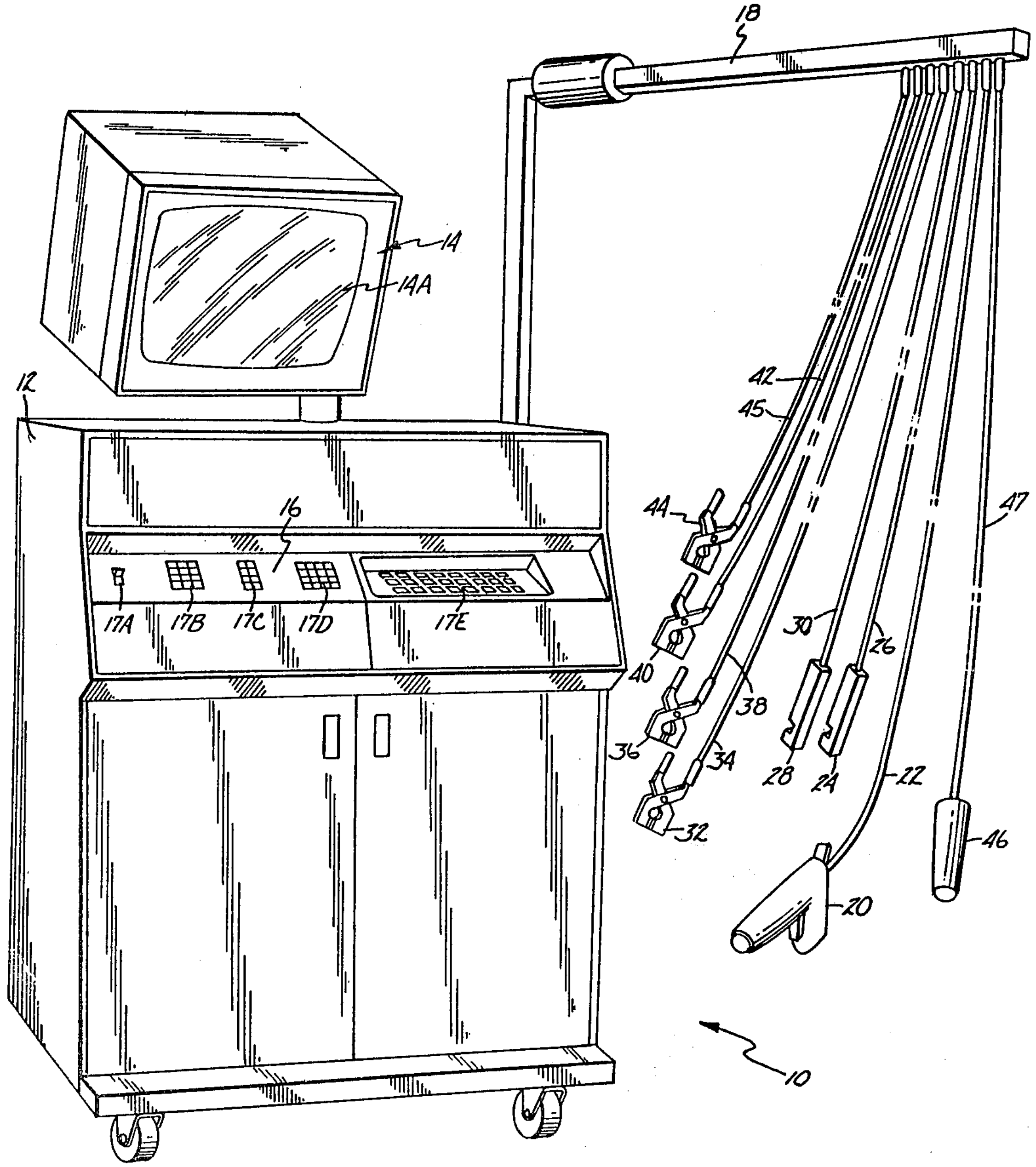
FIG. 1 is a perspective view showing an engine analyzer apparatus which utilizes the engine timing apparatus of the present invention.

In FIG. 1, engine analyzer 10 is shown. Mounted at the front of housing 12 of analyzer 10 are cathode ray tube (CRT) raster scan display 14 and user interface 16, which is preferably a control panel having a power switch 17A, three groups of control switches or keys 17B–17D, as well as a keyboard 17E for entering numerical information. Extending from boom 18 are a plurality of cables which are electrically connected to the circuitry within housing 12, and which are intended for use during operation of the analyzer 10. Timing light 20 is connected at the end of multiconductor cable 22. "High tension" (HT) probe 24 is connected at the end of multiconductor cable 26, and is used for sensing secondary voltage of the ignition system of an internal combustion engine of a vehicle (not shown). "No. 1" probe 28 is connected to the end of multiconductor cable 30, and is used to sense the electrical signal being supplied to the No. 1 sparkplug of the ignition system. "Engine Ground" connector 32, which is preferably an alligator-type clamp, is connected at the end of cable 34, and is typically connected to the ground terminal of the battery of the ignition system. "Points" connector 36, which is preferably an alligator-type clamp, is attached to the end of cable 38 and is intended to be connected to one of the primary winding terminals of an ignition coil of the ignition system. "Coil" connector 40, which is preferably an alligator-type clamp attached to the end of cable 42, is intended to be connected to the other primary winding terminal of the ignition coil. "Battery" connector 44, which is preferably an alligator-type clamp, is attached to the end of cable 45. Battery connector 44 is connected to the "hot" or "non-ground" terminal of the battery of the ignition system. Vacuum transducers 46 at the end of multiconductor cable 47 produces an electrical signal which is a linear function of vacuum or pressure, such as intake manifold vacuum or pressure.

Figure 2:
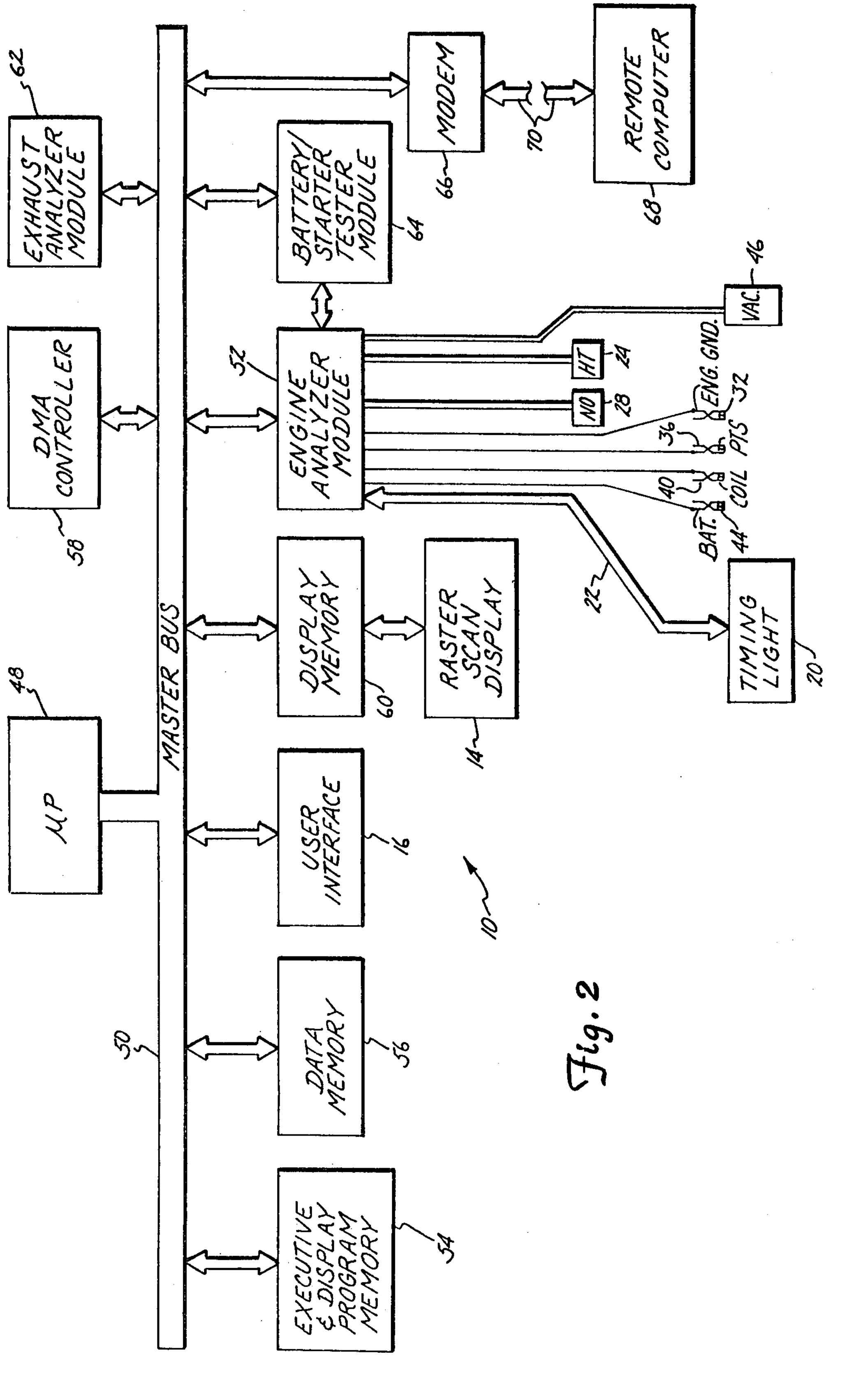
FIG. 2 is an electrical block diagram of the engine analyzer apparatus of FIG. 1.

FIG. 2 is an electrical block diagram showing engine analyzer 10 of the present invention. Operation of engine analyzer 10, including the engine timing apparatus of the present invention, is controlled by microprocessor 48, which communicates with the various subsystems of engine analyzer 10 by means of master bus 58. In the preferred embodiments of the present invention, master bus 50 is made up of fifty-six lines, which form a data bus, an address bus, a control bus, and a power bus.

Timing light 20, HT probe 24, No. 1 probe 28, Engine Ground connector 32, Points connector 36, Coil connector 40, Battery connector 44, and vacuum transducer 46 interface with the electrical system of engine analyzer 10 through engine analyzer module 52. As described in further detail later, engine analyzer module 52 includes a digital section and an analog section. Input signal processing is performed in the analog section, and the input analog waveforms received are converted to digitized waveforms in the form of digital data. The digital section of engine analyzer module 52 interfaces with master bus 50.

Control of the engine analyzer system 10 by microprocessor 48 is based upon a stored program in engine analyzer module 52 and a stored program in executive and display program memory 54 (which interfaces with master bus 50). Digitized waveforms produced, for example, by engine analyzer module 52 are stored in data memory 56. The transfer of digitized waveforms from engine analyzer module 52 to data memory 56 is provided by direct memory access (DMA) controller 58.

User interface 16 interfaces with master bus 50 and permits the operator to enter data and select particular tests or particular waveforms to be displayed.

Display memory 60 contains one bit for each picture element (pixel) that can be displayed on raster scan display 14. Each bit corresponds to a dot on the screen of raster scan display 14.

As further illustrated in FIG. 2, engine analyzer 10 has the capability of expansion to perform other engine test functions by adding other test modules. These modules can include, for example, exhaust analyzer module 62 and battery/starter tester module 64. Both modules 62 and 64 interface with the remaining system of analyzer 10 through master bus 50 and provide digital data or digitized waveforms based upon the particular tests performed by those modules. In the preferred embodiments shown in FIG. 2, modulator/demodulator (MODEM) 66 also interfaces with master bus 50, to permit analyzer 10 to interface with remote computer 68 through communication link 70. This is a particularly advantageous feature, since remote computer 68 typically has greater data storage and computational capabilities that are present within analyzer 10. Modem 66 permits digitized waveforms stored in data memory 56 to be transferred to remote computer 68 for further analysis, and also provides remote computer 68 to provide test parameters and other control information to microprocessor 48 for use in testing.

Figure 3:
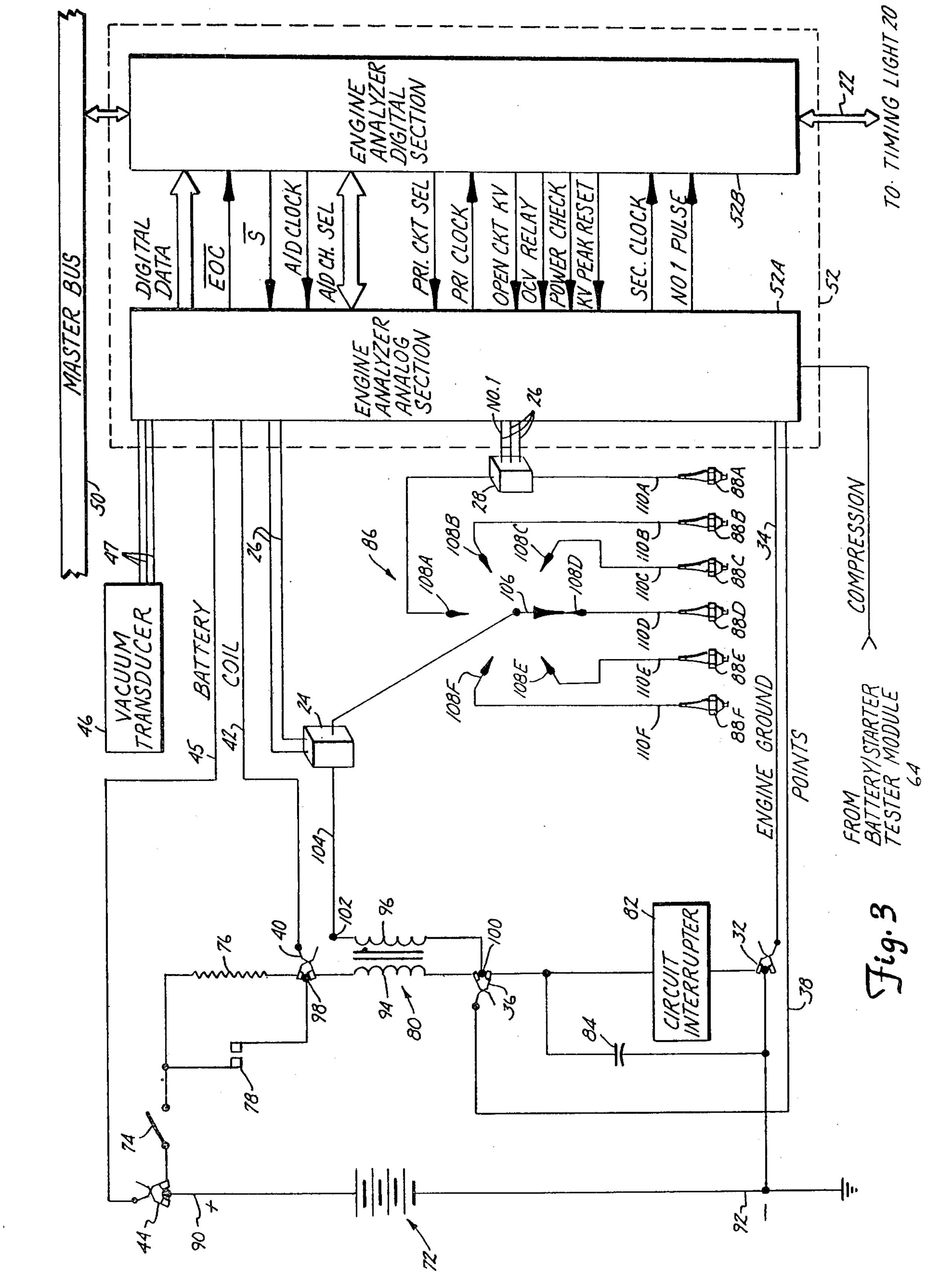
FIG. 3 shows the engine analyzer module of the apparatus of FIG. 2 in electrical schematic form in connection with a conventional ignition system of an internal combustion engine.

FIG. 3 shows engine analyzer 52 connected to a vehicle ignition system, which is schematically illustrated. The ignition system includes battery 72, ignition switch 74, ballast resistor 76, relay contacts 78, ignition coil 80, circuit interrupter 82, condensor 84, distributor 86, and igniters 88A–88F. The particular ignition system shown in FIG. 3 is for a six-cylinder internal combustion engine. Engine analyzer 10 of the present invention may be used with a wide variety of different engines having different numbers of cylinders. The six-cylinder ignition system shown in FIG. 3 is strictly for the purpose of example.

In FIG. 3, battery 72 has its positive (+) terminal 90 connected to one terminal of ignition switch 74, and its negative (−) terminal 92 connected to engine ground. Ignition switch 74 is connected in a series current path with ballast resistor 76, primary winding 94 of ignition coil 80, and circuit interrupter 82 between positive terminal 90 and engine ground (i.e. negative terminal 92). Relay contacts 78 are connected in parallel with ballast resistor 76, and are normally open during operation of the engine. Relay contacts 78 are closed during starting of the engine by a relay coil associated with the starter/-cranking system (not shown) so as to short out ballast resistor 76 and thus reduce resistance in the series current path during starting of the engine.

Condensor 84 is connected in parallel with circuit interrupter 82, and is the conventional capacitor used in ignition systems. Circuit interrupter 82 is, for example, conventional breaker points operated by a cam associated with distributor 86, or is a solid state switching element in the case of solid state ignition systems now available in various automobiles.

As shown in FIG. 3, ignition coil 80 has three terminals 98, 100, and 102. Low voltage primary winding 94 is connected between terminals 98 and 100. Terminal 98 is connected to ballast resistor 76, while terminal 100 is connected to circuit interrupter 82. High voltage secondary winding 96 of ignition coil 80 is connected between terminal 100 and terminal 102. High tension wire 104 connects terminal 102 of coil 80 to distributor arm 106 of distributor 86. Distributor arm 106 is driven by the engine and sequentially makes contact with terminals 108A–108F of distributor 86. Wires 110A–110F connect terminals 108A–108F with igniters 88A–88F, respectively. Igniters 88A–88F normally take the form of conventional spark plugs. While igniters 88A–88F are shown in FIG. 3 as located in a continuous row, it will be understood that they are associated with the cylinders of the engine in such a manner as to produce the desired firing sequence. Upon rotation of distributor arm 106, voltage induced in secondary winding 96 of ignition coil 80 is successively applied to the various igniters 88A–88F in the desired firing sequence.

As shown in FIG. 3, engine analyzer 10 interfaces with the engine ignition system through engine analyzer module 52, which includes engine analyzer analog section 52A and engine analyzer digital section 52B. Input signals are derived from the ignition system by means of Engine Ground connector 32, Points connector 36, Coil connector 40, Battery connector 44, HT secondary voltage probe 24, and No. 1 probe 28. In addition, a vacuum/pressure electrical input signal is produced by vacuum transducer 46, and a COMPRESSION input signal (derived from starter current) is produced by battery/starter tester module 64. These input signals are received by engine analyzer analog section 52A and are converted to digital signals which are then supplied to engine analyzer digital section 52B. Communication between engine analyzer module 52 and microprocessor 48, data memory 56, and DMA controller 58 is provided by engine analyzer digital section 52B through master bus 50. In addition, engine analyzer digital section 52B interfaces with timing light 20 through cable 22.

As illustrated in FIG. 3, Engine Ground connector 32 is connected to negative terminal 92 of battery 72, or other suitable ground on the engine. Points connector 36 is connected to terminal 100 of ignition coil 80, which in turn is connected to circuit interrupter 82. As discussed previously, circuit interrupter 82 may be conventional breaker points or a solid state switching device of a solid state ignition system. Coil connector 40 is connected to terminal 98 of coil ignition 80, and Battery connector 44 is connected to positive terminal 90 of battery 72. All four connectors 32, 36, 40 and 44 are, therefore, connected to readily accessible terminals of the ignition system, and do not require removal of conductors in order to make connections to the ignition system.

HT probe 24 is a conventional probe used to sense secondary voltage in conductor 104. Similarly, No. 1 probe 28 is a conventional probe used to sense current flow through wire 110A. In the example shown in FIG. 3, igniter 88A has been designated as the igniter for the "No. 1" cylinder of the engine. Both probe 24 and probe 28 merely clamp around existing conductors, and thus do not require removal of conductors in order to make measurements.

Figure 4:
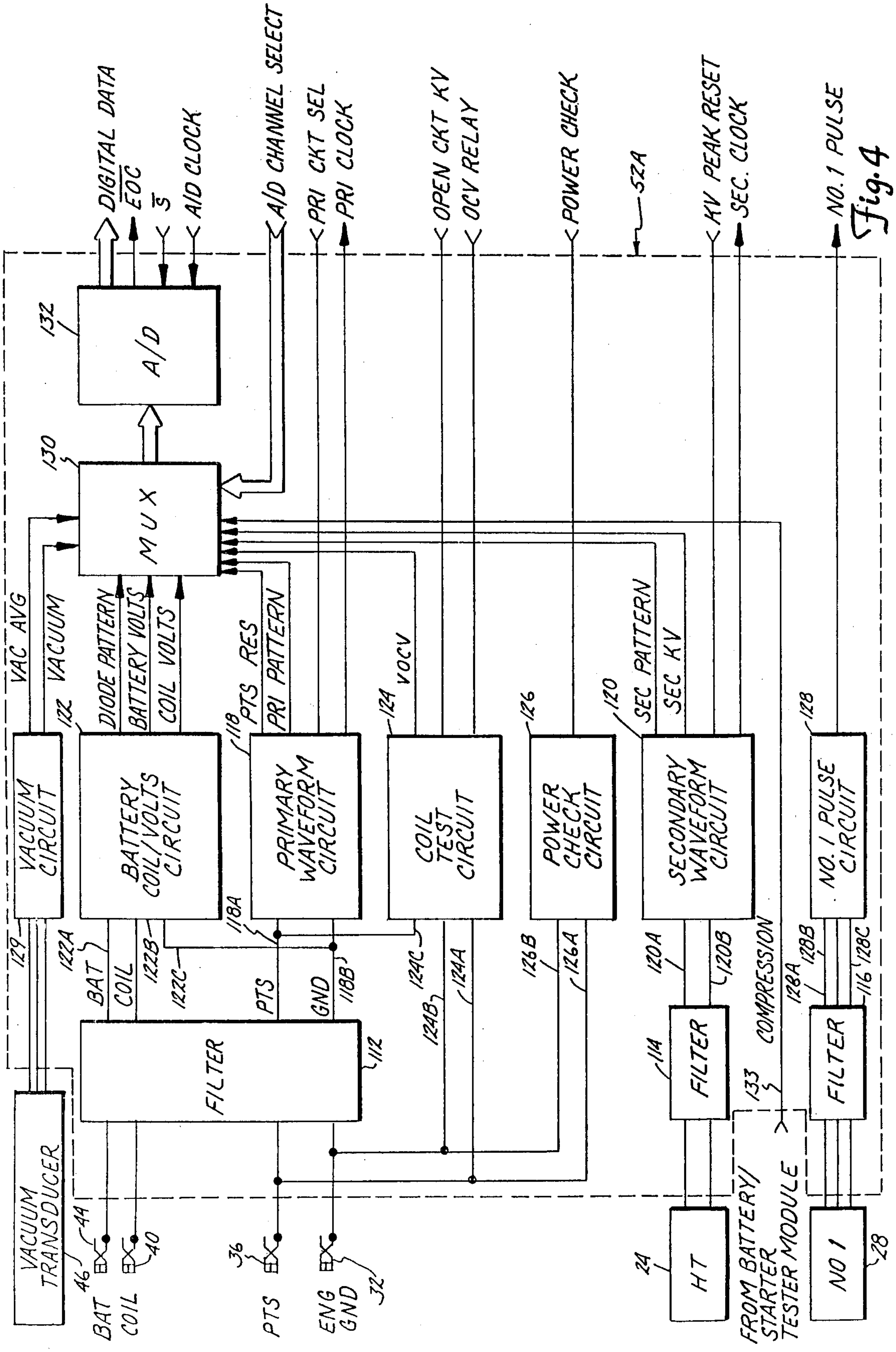
FIG. 4 is an electrical block diagram of the analog section of the engine analyzer module of FIG. 3.

FIG. 4 is an electrical block diagram showing engine analyzer analog section 52A, together with HT probe 24, No. 1 probe 28, Engine Ground connector 32, Points connector 36, Coil connector 40, Battery connector 44, and vacuum transducer 46. Analog section 52A includes input filters 112, 114, and 116, primary waveform circuit 118, secondary waveform circuit 120, battery coil/volts circuit 122, coil test circuit 124, power check circuit 126, No. 1, pulse circuit 128, vacuum circuit 129, multiplexer (MUX) 130, and analog-to-digital (A/D) converter 132. Analog section 52A supplies digital data, an end-of-conversion signal (EOC), a primary clock signal (PRI CLOCK), a secondary clock signal (SEC CLOCK), and a No. 1 PULSE signal to engine analyzer digital section 52B. Analog section 52A receives an S signal, an A/D CLOCK signal, A/D CHANNEL SELECT signals, a primary circuit select signal (PRI CKT SEL), an OPEN CKT KV signal, an OCV RELAY signal, a POWER CHECK signal and a KV PEAK RESET signal from engine analyzer digital section 52B.

For the engine timing function which is the basis of the present invention, the PRI CLOCK signal from primary waveform circuit 118, the SEC CLOCK signal from secondary waveform circuit 120, and the No. 1 PULSE signal from No. 1 pulse circuit 128 are the signals of interest. Production of these three signals will be discussed in detail while production of the other signals will not be discussed further. Reference may be made to a co-pending application Ser. No. 327,734 by J. Marino, M. Kling and S. Roth entitled "Engine Analyzer with Digital Waveform Display" filed Dec. 4, 1981 and assigned to the same assignee for further description of analog section 52A.

Points connector 36 and engine ground connector 32 are connected through filter circuit 112 to inputs 118A and 118B, respectively, of primary waveform circuit 118. Filter circuits 112, 114 and 116 are preferably inductive-capacitive filters which filter input signals to suppress or minimize the high frequency noise signals typically generated by the ignition system. Based upon the signal appearing at its inputs, 118A and 118B, primary waveform circuit 118 supplies a primary clock signal to digital section 52B, and also provides a primary pattern (PRI PATTERN) waveform and a points resistance (PTS RES) signal to multiplexer 130.

The primary clock (PRI CLOCK) signal is a filtered signal that is 180° out of phase with the primary signal appearing between Points connector 36 and Engine Ground connector 32. The PRI CLOCK signal is a square wave signal that is high during the time period when the circuit interrupter 82 is conductive and is low during the time when circuit interrupter 82 is non-conductive. In preferred embodiments of the present invention, primary waveform circuit 118 amplifies the primary signal appearing between Points connector 36 and Engine Ground connector 32, filters the amplified signal, and compares the amplified and filtered signal to a reference or threshold voltage. This reference or threshold voltage has two levels, which are selectable by the PRI CKT SEL signal supplied by digital section 52B. The PRI CKT SEL signal causes primary waveform circuit 118 to use one threshold voltage level when conventional breaker points are used as circuit interrupter 82, and a second threshold voltage when circuit interrupter 82 is a solid state type of circuit interrupter (such as a General Motors HEI solid state ignition system).

In preferred embodiments of the present invention, primary waveform circuit 118 includes circuitry to invert the primary ignition signal in the event that the primary ignition signal is a negative going signal, which occurs with vehicles equipped with the battery positive terminal at engine ground. As a result, the PRI CLOCK signal produced by primary waveform circuit 118 is unchanged, regardless of whether the vehicle has a positive or negative ground.

The secondary voltage sensed by HT probe 24 is supplied through filter 114 to inputs 120A and 120B of secondary waveform circuit 120. The secondary voltage is reduced by a capacitive divider by a factor of 10,000, is supplied through a protective circuit which provides protection against intermittent high voltage spikes, and is introduced to three separate circuits. One circuit supplies the SEC CLOCK signal; a second circuit supplies a secondary pattern (SEC PATTERN) waveform to multiplexer 130, and a third circuit supplies the SEC KV signal to multiplexer 130.

The SEC CLOCK signal is a negative going signal which occurs once for each secondary ignition signal pulse, and has a duration of approximately 1 millisecond. The inverted secondary voltage signal is amplified and is used to drive two cascaded one shot multivibrators (not shown).

The signal from No. 1 voltage probe 28 is supplied through inductive-capacitive type filter 116 to inputs 128A–128C of No. 1 pulse circuit 128, where it is filtered, amplified, and used to drive a pair of cascaded one shot multivibrators (not shown). The resulting No. 1 PULSE output signal of No. 1 pulse circuit 128 is a positive going pulse of 1 millisecond duration that corresponds in time to the ignition pulse supplied to the No. 1 igniter 88A (FIG. 3).

Figure 5:
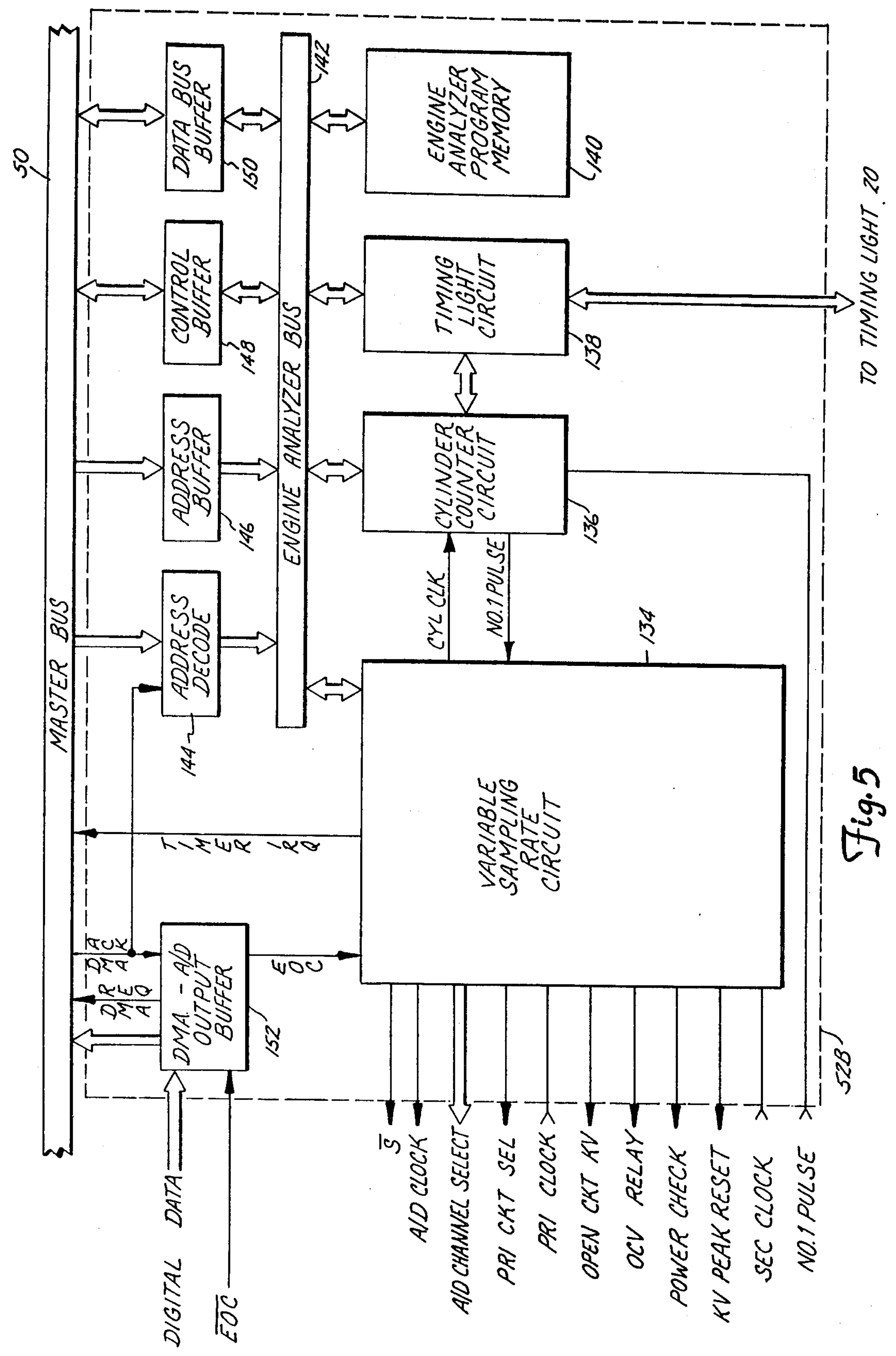
FIG. 5 is an electrical block diagram of the digital section of the engine analyzer module of FIG. 3.

FIG. 5 is an electrical block diagram of digital section 52B of engine analyzer module 52. Digital section 52B includes variable sampling rate circuit 134, cylinder counter circuit 136, timing light circuit 138 and engine analyzer program memory 140, all of which are connected to engine analyzer bus 142. In preferred embodiments of the present invention, engine analyzer bus 142 includes digital data lines, address lines and control lines. Interface between digital section 52B and the remaining circuitry of engine analyzer 10 is provided by means of master bus 50. Address decode circuit 144, address buffer circuit 146, control buffer circuit 148, data bus buffer circuit 150, and DMA-A/D output buffer circuit 152 provide an interface between master bus 50 and the remaining circuitry of digital section 52B.

Variable sampling rate circuit 134 receives the PRI CLOCK and SEC CLOCK signals from analog section 52A, and provides the various control signals to analog section 52A which determine the particular test being performed and the particular digital data which is received from analog section 52A. These control signals include the S and A/D CLOCK signals supplied to A/D converter 132, the A/D CHANNEL SELECT signal supplied to multiplexer 130, the PRI CKT SEL signal supplied to primary waveform circuit 118, the OPEN CKT KV and OCV RELAY signals supplied to coil test circuit 124, the POWER CHECK signal supplied to power check circuit 126 and the KV PEAK RESET signal supplied to secondary waveform circuit 120. Variable sampling rate circuit 134 produces the CYL CLK signal, which is based upon either the PRI CLOCK or the SEC CLOCK signal and supplies this signal to cylinder counter circuit 136. The CYL CLK signal is also used by variable sampling rate circuit 134 to determine the period of the primary or secondary waveform. Variable sampling rate circuit 134 supplies this period measurement to microprocessor 48 via engine analyzer bus 142 and master bus 150. Based upon this period measurement, microprocessor 48 selects the desired data sample rate to be used by A/D converter 132, and supplies control signals to variable sampling rate circuit 134 via master bus 150 and engine analyzer bus 142. The data sample rate is controlled by variable sampling rate circuit 134 by means of the A/D CLOCK signal. Variable sampling rate circuit 134 also receives the EOC signal from DMA-A/D output buffer 152 and the No. 1 PULSE signal from cylinder counter circuit 136.

In many of the test functions performed by engine analyzer module 52, it is necessary to determine the current cylinder number at various points in time. These engine tests include waveform displays, power check test and engine timing measurements. Keeping track of cylinder number by using microprocessor 48 becomes inconvenient, particularly when microprocessor 48 is involved in digitizing waveforms, and in reconstructing waveforms for display on raster scan display 14. In the preferred embodiment shown in FIG. 5, cylinder counter circuit 136 performs this cylinder number function. Cylinder counter circuit 136 includes a presettable counter which is loaded with the number of cylinders of the engine under test by data supplied from microprocessor 48 through master bus 50, data bus 150 and engine analyzer bus 142. The number of cylinders of the engine under test is typically supplied to microprocessor 48 through user interface 16.

Cylinder counter circuit 136 counts in response to the CYL CLK signal. The current count of cylinder counter circuit 136 is provided both to the engine analyzer bus 142 and to timing light circuit 138.

The No. 1 PULSE signal from analog section 52A is supplied to cylinder counter circuit 136. At the beginning of operation of engine analyzer module 52, the first pulse of the No. 1 PULSE signal presets cylinder counter circuit 136 and thereby synchronizes it to the engine. After that, the No. 1 probe 28 can be removed and the No. 1 PULSE signal discontinued, and cylinder counter circuit 136 will still remain in synchronization with the engine as long as the CYL CLK signal continues to be supplied. Cylinder counter circuit 136 also is capable of operation without the No. 1 PULSE signal, and in that case is synchronized to the engine operation by manual inputs supplied by the operator through a BUMP control switch 192 (described later in conjunction with FIG. 6) on timing light 20.

Timing light circuit 138 controls operation of timing light 20, based upon control signals from microcomputer 48, the cylinder count from cylinder counter circuit 136, and operator input signals supplied from control switches on timing light 20.

In the preferred embodiment shown in FIG. 5, the operation of engine analyzer module 52, under the control of microprocessor 48, is based upon a stored engine analyzer program stored in engine analyzer program memory 140. When the operator selects, through user interface 16, a test function involving engine analyzer module 52, microprocessor 48 interrogates engine analyzer module 52 to determine that it is present in the system, and addresses engine analyzer program memory 140 for the operating instructions required for that particular test. In preferred embodiments of the present invention, each test module such as engine analyzer module 52, exhaust analyzer module 62, and battery/-starter tester module 64 (FIG. 2) has its own associated program memory. As a result, only that memory capacity required for the particular test modules being used is provided.

Figure 6:
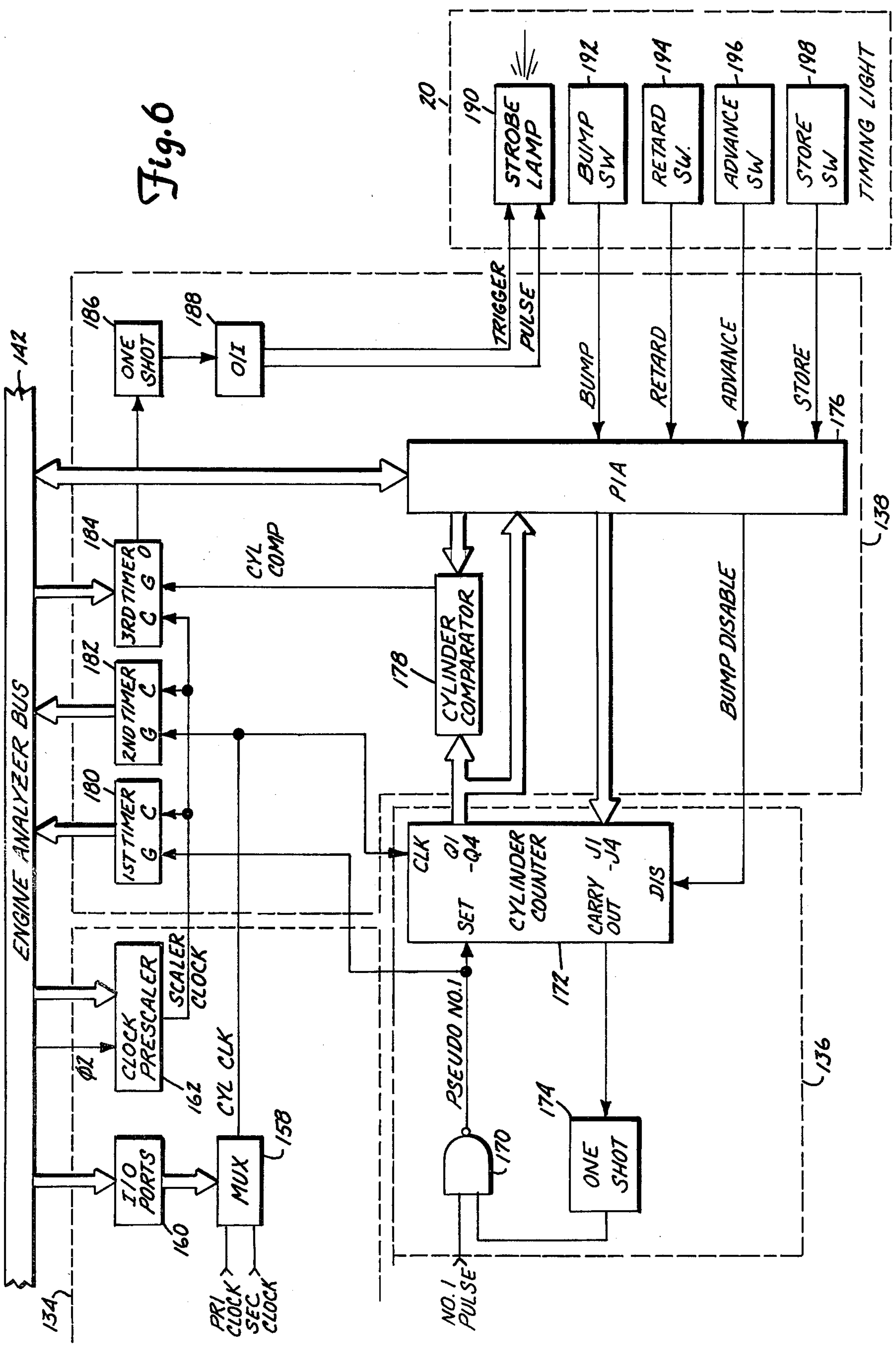
FIG. 6 is an electrical block diagram of the timing light together with those portions of the digital section shown in FIG. 5 which relate to the engine timing function.

FIG. 6 is an electrical block diagram which shows timing light 20, as well as those portions of digital section 52B which are specifically concerned with the engine timing function of the present invention.

As shown in FIG. 6, a portion of variable sampling rate circuit 134 including multiplexer 158, input/output (I/O) ports 160, and clock prescaler 162 are used in the engine timing function. Multiplexer 158 receives the PRI CLK and SEC CLK signal from analog section 52A. Multiplexer 158 supplies one of these signals as the CYL CLK signal to both cylinder counter circuit 136 and timing light circuit 138.

Clock prescaler 162 receives data from engine analyzer bus 142 which selects a frequency for its SCALER CLOCK output signal. Clock prescaler 162 also receives a clock signal Ø2 from engine analyzer bus 142, which is preferably on the order 1 MHz. Microprocessor 48 selects, by the scaling factor supplied to clock prescaler 162, either the 1 MHz frequency of the Ø2 signal or some lower frequency for the SCALER CLOCK signal frequency.

Cylinder counter circuit 136 includes NAND gate 170, cylinder counter 172, and one shot multivibrator 174. Cylinder circuit 136 receives the No. 1 pulse signal (if present) from analog section 52A, the CYL CLK signal from multiplexer 158, a digital value representative of the number of cylinders of the engine from microprocessor 48 via timing light circuit 138, and a BUMP DISABLE signal from timing light circuit 138. The outputs of cylinder counter circuit 136 are a PSEUDO NO 1 pulse signal and a digital count, both of which are supplied to timing light circuit 138.

Timing light circuit 138 includes programmable interface adapter (PIA) 176, cylinder comparator 178, first timer 180, second timer 182, third timer 184, one shot multivibrator 186, and opto-isolator (O/I) 188. Timing light circuit 138 communicates with microprocessor 48 through engine analyzer but 142, and also receives the CYL CLK and SCALER CLOCK signals from variable timing circuit 134, the PSEUDO NO. 1 signal and the cylinder count from cylinder counter circuit 136, and BUMP, RETARD, ADVANCE and STORE signals from timing light 20. The outputs of timing light circuit 138 include the digital cylinder number and the BUMP DISABLE signal supplied to cylinder counter circuit 136, measured times supplied by first and second timers 180 and 182 supplied to engine analyzer bus 142, output values from PIA 176 supplied to engine analyzer bus 142, and the output of opto-isolator 188, which flashes timing light 20.

As shown in FIG. 6, timing light 20 includes strobe lamp 190 and four input switches or buttons: Bump switch 192, Retard switch 194, Advance switch 196, and Store switch 198. Strobe lamp 190 is flashed each time an output signal is supplied from opto-isolator 188 of timing light circuit 138. In a preferred embodiment, strobe lamp 190 is powered by twelve volts DC and is triggered by the timing light trigger pulse from opto-isolator 188.

Bump switch 192 is preferably a pushbutton switch which is actuated by the operator to cause the timing reference to switch to another cylinder when timing light 20 is used without having No. 1 probe 28 connected. When No. 1 probe 28 is used, Bump switch 192 has no effect.

Retard switch 194 provides the RETARD signal to PIA 176. Retard switch 194 is a operator-actuated pushbutton switch which causes the flash delay to decrease incrementally as long as Retard switch 194 is pressed.

Advance switch 196 is a pushbutton switch which supplies the ADVANCE signal to PIA 176. The effect of Advance switch 196 is the opposite of Retard switch 194. In other words, Advance switch 196 causes the flash delay to increase incrementally as long as Advance switch 196 is pressed.

Store switch 198 supplies a STORE signal to PIA 176 which causes microprocessor 48 to store the current timing advance/retard angle reading.

In general, the operation of the engine timing apparatus of the present invention requires the operator to adjust the flashing of strobe lamp 190 so that the timing mark illuminated by strobe lamp 190 comes into alignment with a top dead center position mark by use of Retard switch 194 and Advance switch 196. Once the timing mark is aligned with the top dead center position, the operator presses Store switch 198, and microprocessor 48 computes and displays the timing advance/retard angle on raster scan display 14.

In the preferred embodiment of the present invention illustrated in FIG. 6, cylinder counter 172 is a presettable divide by 16 counter which is loaded with a value equal to the number of cylinders via jam inputs J1–J4. This value is supplied by microprocessor 48 through PIA 176. Counter 172 presets itself to the value at jam inputs J1–J4 each time an input signal is received at its SET input.

Cylinder counter 172 receives the CYL CLK signal at its clock (CLK) input. Counter 172, therefore, keeps track of the current cylinder number and also generates the PSEUDO No. 1 pulse as an engine sync pulse. If No. 1 probe 28 is providing the No. 1 PULSE signal to NAND gate 170, this pulse is supplied through NAND gate 1720 to the SET input of cylinder counter 172. In that case, the PSEUDO No. 1 pulse corresponds to the firing of the cylinder detected by the No. 1 probe 28 (in the example shown in FIG. 2, the No. 1 cylinder corresponds to igniter 88A). If, on the other hand, No. 1 probe 28 is not connected, the CARRYOUT output of cylinder counter 172 triggers one shot 174, which supplies a PSEUDO No. 1 pulse through NAND gate 170 to reset counter 172. In this case, the PSEUDO No. 1 pulse is synchronized to the operation of the engine in time, but does not necessarily correspond to the actual No. 1 cylinder. By using Bump switch 192 on timing light 20, the operator can adjust the synchronization of cylinder counter 172 to correspond to the No. 1 cylinder or its complement when No. 1 probe 28 is not connected.

When Bump switch 192 is pressed, microprocessor 48 supplies a BUMP DISABLE signal through PIA 176 to the dis-input of cylinder counter 172. This disables counter 172 and prevents it from counting in response to one pulse of CYL CLK signal. As a result, cylinder counter 172 has effectively skipped one cylinder, and the PSEUDO No. 1 pulse generated will correspond to the next later cylinder from that which it corresponded to before bump switch 192 was pressed. By continued operation of Bump switch 192, the operator can cause cylinder counter 172 to shift the occurrence of the PSEUDO No. 1 pulse until it corresponds to either the No. 1 cylinder or its complement. Since the crank shaft of a typical four-cycle internal combustion engine rotates twice for one complete cycle of all cylinders, the flashing of the strobe lamp 190 corresponding to either the No. 1 cylinder or its complement (i.e. a cylinder half-way through the total number of cylinders) will illuminate the timing mark.

The output of cylinder counter 172 is a digital count which appears at its Q1–Q4 outputs. This digital count is supplied to cylinder comparator 178 and to microprocessor 48 through PIA 176.

First timer 180 of timing light circuit 138 receives the SCALER CLOCK signal at its clock (C) input and the PSEUDO No. 1 signal at its gate (G) input. It supplies an output count to microprocessor 48 through engine analyzer bus 142. First timer 180 measures the time period $P_1$ between PSEUDO No. 1 pulses. Time period $P_1$ is used by microprocessor 48 For calculation of engine speed and flash delay time.

Figure 7:
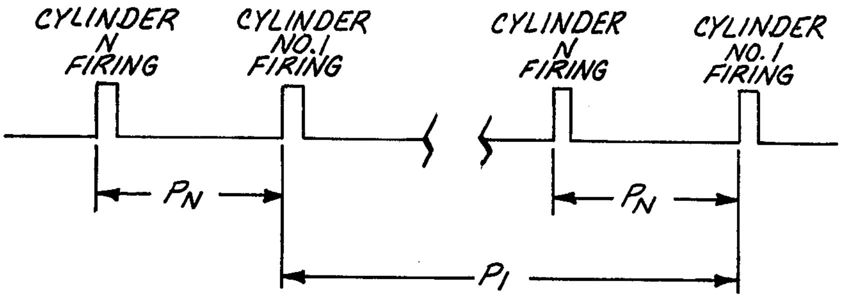
FIG. 7 is an electrical waveform representative of firing of the various igniters of an internal combustion engine under test.

Second timer 182 receives a SCALER CLOCK signal at its clock (C) input and the CYL CLK signal at its gate (G) input. The output of second timer 182 is a count representing the time period of any selected cylinder. As will be described in further detail, second timer 182 is used particularly to measure the time period $P_N$ which represents the period of the cylinder N immediately preceding the No. 1 cylinder (as indicated by the PSEUDO No. 1 pulse). In the specific example shown in FIG. 3, cylinder N corresponds to igniter 88F. FIG. 7 shows a waveform illustrating the firing of cylinders and periods $P_1$ and $P_N$.

Cylinder comparator 178 compares the count output of cylinder counter 172 with a comparison cylinder count supplied by microprocessor 48 through PIA 176. This comparison count corresponds to cylinder N, which is the cylinder preceding the No. 1 cylinder. When the cylinder count from cylinder counter 176 corresponds to the comparison count from PIA 176, cylinder comparator 178 provides the CYL COMP output signals to PIA 176 and to the gate (G) input of third timer 176.

Third timer 184 is in effect a programmable one shot which generates a pulse of variable width. The width of the pulse is controlled by microprocessor 48 by loading third timer 184 with a digital time delay value (TD). When third timer 184 is gated on by the CYL COMP signal, it counts in response to the SCALER CLOCK signal which is supplied to its clock (C) input. The output of third timer 184 remains high from the time it is gated on until it is counted down to zero.

Hardware one shot 186 is triggered by the falling edge of the output of third timer 184, and generates a trigger pulse of predetermined duration. The trigger pulse is supplied to opto-isolator 188, which in turn supplies the trigger pulse to strobe lamp 190.

The firing of strobe lamp 190, therefore, is controlled by microprocessor 48 by means of the digital time delay value TD loaded into third timer 184. This digital value controls the time delay between firing of the cylinder N (e.g. igniter 88F) immediately preceding the No. 1 cylinder (e.g. igniter 88A) and the trigger pulse supplied to strobe lamp 190.

Before starting the flashing of strobe lamp 190, or after Bump switch 192 has caused bumping of synchronization to a new cylinder, microprocessor 48 initiates two measurements which are required to prepare for accurate timing light operation. Microprocessor 48 must compute the number of degrees N° of engine revolution from the firing of cylinder N to the firing of cylinder No. 1.

To do this, microprocessor 48 uses first timer 180 to measure the period $P_1$ between two successive firings of No. 1 cylinder, and uses second timer 182 to measure the period $P_N$ of cylinder 10. Based upon the digital value of $P_1$ obtained from first timer 180 and $P_N$ obtained from second timer 182, microprocessor 48 calculates N°, which equals the number of degrees from cylinder N firing to cylinder No. 1 firing. This calculation is based upon the following relationship:

$$N^{\circ} = (P_N/P_1) \times 720 \quad \text{Equation No. 1}$$

N° is computed by microprocessor 48 to 0.1 degree resolution.

Actual flashing of strobe lamp 190 is accomplished by generating a trigger pulse that is delayed from cylinder N firing by N° plus a timing advance angle A°. In the present invention, firing of cylinder N is used to initiate the timing light operation rather than firing of cylinder No. 1, so that retarded timing readings can also be provided. For a retarded timing reading, advance angle A° is negative, and when added to N°, it produces a delay which is less than N° so that triggering of strobe lamp 190 occurs before firing of No. 1 cylinder.

Figure 8:
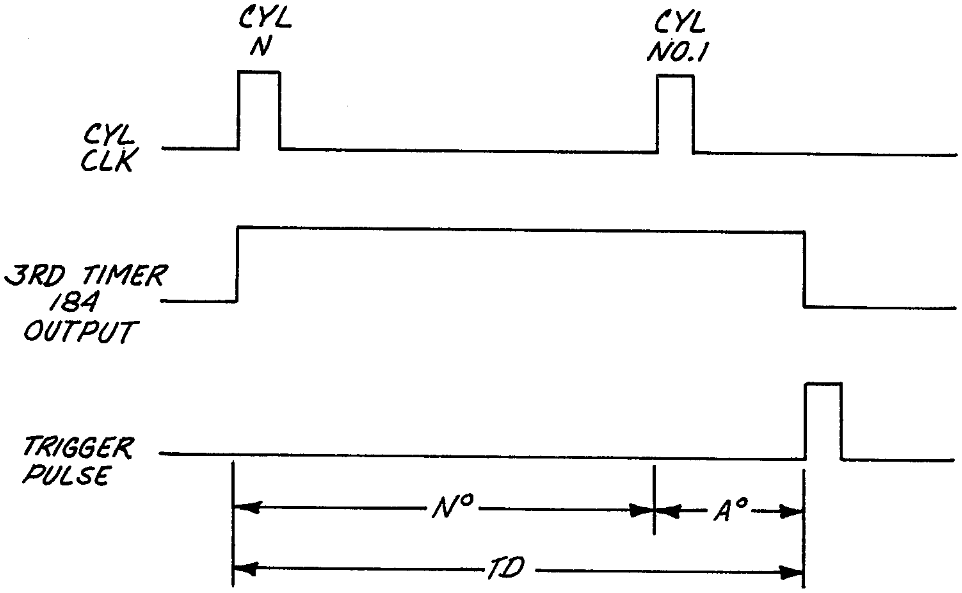
FIG. 8 is a group of electrical waveforms illustrating the operation of the engine timing apparatus in determining an advance timing angle.
Figure 9:
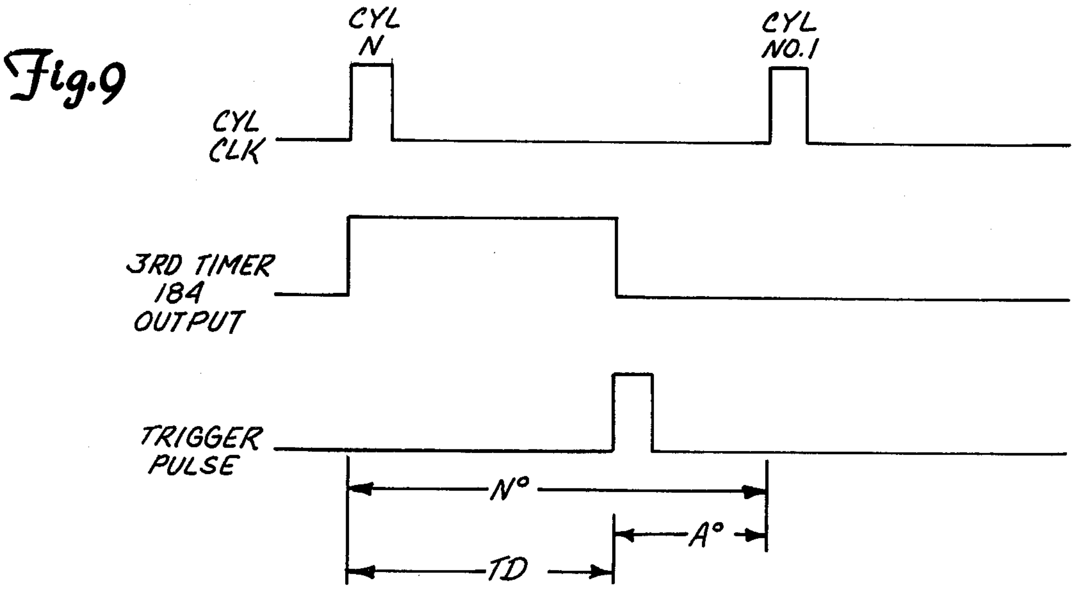
FIG. 9 is a group of electrical waveforms illustrating the operation of the engine timing apparatus in determining a retard timing angle.

FIGS. 8 and 9 show waveforms which illustrate the relatonship between firing of cylinder N, firing of cylinder No. 1, operation of third timer 184, and operation of one shot 186 to produce the flash trigger pulse. FIGS. 8 and 9 also illustrate the relationship between N°, advance angle A°, and time delay TD. In the example shown in FIG. 8, advance angle A° is a positive value, thus representing a timing advance (i.e. cylinder No. 1 fires before top dead center). In the example shown in FIG. 9, advance angle A° is a negative value, thus representing a timing retard (i.e. cylinder No. 1 fires after top dead center).

When cylinder N fires, cylinder comparator 178 provides the CYL COMP gates on third timer 184 which generates delay TD=N°+A°. At the end of delay TD, one shot 186 is triggered to generate the trigger pulse supplied to strobe lamp 190. This sequence occurs every time cylinder N fires.

Time delay TD must be adjusted regularly to account for any change in engine speed. Microprocessor 48 accomplishes this adjustment by continually monitoring period $P_1$ by means of first timer 180. Microprocessor 48 adjusts N° and thus TD accordingly.

As the operator presses Advance switch 196 or Retard switch 194, microprocessor 48 automatically adjusts the value of A° by 0.1 degree increments. Microprocessor 48 incrementally reduces the value of A° as long as Retard switch 192 is pressed, and incrementally increases the value of A° as long as Advance switch 196 is pressed. Microprocessor 48 continually adjusts time delay TD for changes in A° as well as changes in $P_1$.

Microprocessor 48 computes time delay TD as follows:

$$TD = \frac{(N^\circ + A^\circ) \times P_1}{(720)} \quad \text{Equation No. 2}$$

In operation, the operator presses retard switch 194 or advance switch 196 until time delay TD has a value which synchronizes flashing of strobe lamp 190 so that the timing mark is aligned with the top dead center position. This is determined visually by the operator looking at the timing mark while strobe lamp 190 is being flashed. Once this desired condition is achieved, the operator presses Store switch 198. This signals microprocessor 48 that the desired value of time delay TD has been achieved. Microprocessor 48 then displays the value A° on raster scan display 14. This value A° represents the timing advance/retard value in degrees. If A° is positive, it represents an advance angle by which firing of cylinder No. 1 precedes top dead center. If A° is negative, it represents a retard angle corresponding to the number of degrees after top dead center at which cylinder No. 1 fires.

An important advantage of the engine timing apparatus of the present invention is that it simplifies the operations actually performed by the operator (or service technician). Instead of requiring the operator to adjust and then read a potentiometer, the present invention allows adjustment of the flashing of strobe lamp 190 through a pair of pushbutton switches (Retard switch 194 and Advance switch 196). In addition, by pressing Store switch 198, the operator signals microprocessor 48 to display the timing advance/retard angle A° on display 14. No reading of a potentiometer or interpretation of results is required of the operator.

In many cases, the operator or mechanic only desires to perform a quick engine timing check, and does not wish to connect all of the leads of the engine analyzer system simply to perform the engine timing function. With the present invention, engine timing can be performed by use of only HT probe 24, which will produce the SEC CLOCK signal. Connection of the No. 1 probe 28 is not necessary with the present invention, since synchronization of the flashing of strobe lamp 190 can be shifted by means of Bump switch 192. The engine timing apparatus of the present invention provides high accuracy which is inherent in the use of digital timers and digital microprocessor 48 and yet is extremely simple to use.

Although the present invention has been described with reference to preferred embodiments, workers skilled in the art will recognize that changes may be made in form and detail without departing from the spirit and scope of the invention.

What is claimed is:

1. An engine timing apparatus for use in testing of a multi-cylinder internal combustion engine having an igniter associated with each cylinder and having an electrical ignition system for sequentially supplying ignition signals to fire the igniters in a predetermined firing order, the engine timing apparatus comprising:

timing light means for providing a light pulse in response to an electrical trigger pulse;

means for deriving a cylinder clock signal from the electrical ignition system, the cylinder clock signal being indicative of the firing of the igniters;

cylinder counter means for counting in response to the cylinder clock signal and for generating a counter output signal when a selected cylinder count representative of a selected cylinder is attained;

cylinder comparator means for comparing the count in the cylinder counter means with a predetermined count representative of a cylinder preceding the selected cylinder and providing a comparator output signal when the predetermined count is attained;

first timer means for generating data corresponding to a first time period between counter output signals;

second timer means for generating data corresponding to a second time period between the cylinder preceding the selected cylinder and the selected cylinder;

third timer means for initiating an adjustable time delay in response to the comparator output signal;

trigger pulse generator means for generating the electrical trigger pulse at an end of the adjustable time delay;

means for deriving, from the data corresponding to the first and second time periods, a first digital value representative of angular degrees from firing of the cylinder preceding the selected cylinder and firing of the selected cylinder;

first operator actuated means for producing a variable second digital value;

means for controlling the adjustable time delay as a function of the first and second digital values; and display means for displaying an angular value representative of an angular relationship between firing of the igniter of the selected cylinder and top dead center of the selected cylinder based upon the second digital value.

2. The invention of claim 1 wherein the means for controlling the adjustable time delay adjusts the adjustable time delay as a function of the measured first time period to compensate for variations in engine speed.

3. The invention of claim 1 and further comprising:

second operator actuated means for providing a signal indicating that a desired timing advance angle has been attained, and wherein the display means displays the angular value in response to the signal from the second operator actuated means.

4. The invention of claim 1 wherein the first operator actuated means comprises:

operator actuated advance means for providing an electrical signal which causes the second digital value to be increased; and operator actuated retard means for providing an electrical signal which causes the second digital value to be decreased.

5. The invention of claim 4 wherein the operator-actuated advance means comprises an advance switch which provides an electrical signal which causes the second digital value to be incrementally increased as long as the advance switch is actuated; and wherein the operator-actuated retard means is a retard switch which provides an electrical signal which causes the second digital value to be incrementally decreased as long as the retard switch is actuated.

6. The invention of claim 5 wherein the advance switch and the retard switch are mounted on and carried by the timing light means.

7. The invention of claim 1 and further comprising:
third operator actuated means for providing an electrical signal which inhibits counting of the cylinder counter means in response to the cylinder clock signal to cause the selected cylinder count to be representative of a different selected cylinder.

8. The invention of claim 7 and further comprising:
No. 1 probe means for deriving a No. 1 pulse signal from the electrical ignition system indicative of firing of the igniter associated with a No. 1 cylinder; and
means for supplying the No. 1 pulse signal to the cylinder counter means to cause the cylinder counter means to generate the counter output signal at a time synchronized to the No. 1 pulse signal, so that the selected cylinder corresponds to the No. 1 cylinder.

9. An engine timing apparatus for use in testing a multi-cylinder internal combustion engine in which the cylinders of the internal combustion engine are fired in a predetermined sequential order, and in which a timing mark appears on a movable driven portion of the engine and a fixed reference mark indicative of top dead center is positioned adjacent the movable driven portion carrying the timing mark, the engine timing apparatus comprising:
timing light means for providing a light pulse in response to an electrical trigger pulse, the firing light means being adapted to be hand-held by an operator to permit the light pulse to be direted so as to illuminate the timing mark and the reference mark on the internal combustion engine;
means for connection to the internal combustion engine for deriving a cylinder clock signal indicative of the firing of each of the cylinders of the internal combustion engine;
means responsive to the cylinder clock signal for generating a first signal each time firing of a selected cylinder occurs and for generating a second signal each time firing of a cylinder preceding the selected cylinder occurs;
means responsive to the first signal for generating data corresponding to a first time period between firings of the selected cylinder;
means responsive to the second signal and the first signal for generating data corresponding to a second time period between firing of the cylinder preceding the selected cylinder and firing of the selected cylinder;
means for deriving, from the data corresponding to the first and second time periods, a first digital value representative of angular degrees from firing of the cylinder preceding the selected cylinder to firing of the selected cylinder;
means for initiating an adjustable time delay in response to the second signal;
means for generating the electrical trigger pulse at the end of the adjustable time delay;
means for controlling the adjustable time delay as a function of the first digital value and a second variable digital value;
operator-actuated means for varying the second digital value to thereby vary the adjustable time delay so that an operator can vary relative timing of the light pulse until the timing mark appears to be aligned with the reference mark; and
means for displaying an angular value representative of angular relationship between firing of the selected cylinder and top dead center of the selected cylinder based upon the second digital value.

10. The invention of claim 9 and further comprising:
means for providing an electrical signal which causes the first and second signals to be shifted in time so as to correspond to firing of different cylinders.

11. The invention of the claim 9 wherein the means for varying the second digital value comprises:
an advance switch for providing an electrical signal which causes the digital value to be sequentially incrementally increased as long as the advance switch is actuated by the operator; and
a retard switch for providing an electrical signal which causes the second digital value to be sequentially incrementally decreased as long as the retard switch is actuated by the operator.

* * * * *